United States Patent [19]
Morel et al.

[11] Patent Number: 4,510,792
[45] Date of Patent: Apr. 16, 1985

[54] APPARATUS FOR MEASURING AND DISPLAYING LEAKAGE RATES IN A TRACER GAS LEAKAGE DETECTOR

[75] Inventors: Jacques Morel; Jacques Tallon, both of Annecy, France

[73] Assignee: Compagnie Industrielle des Telecommunications Cita-Alcatel, Paris, France

[21] Appl. No.: 525,902

[22] Filed: Aug. 24, 1983

[30] Foreign Application Priority Data

Aug. 27, 1982 [FR] France ............................. 82 14699

[51] Int. Cl.³ ........................................... G01M 3/22
[52] U.S. Cl. ..................................................... 73/40.7
[58] Field of Search ......................... 73/40.7; 250/288

[56] References Cited

U.S. PATENT DOCUMENTS

| 3,327,521 | 6/1967 | Briggs | 73/40.7 |
| 3,342,990 | 9/1967 | Barrington et al. | 73/40.7 X |
| 3,416,359 | 12/1968 | Durbin et al. | 73/40.7 |
| 3,592,048 | 7/1971 | Maurice et al. | 73/40.7 |
| 3,626,760 | 12/1971 | Briggs et al. | 73/40.7 |
| 3,690,151 | 9/1972 | Briggs | 73/40.7 |
| 3,968,675 | 7/1976 | Briggs | 73/40.7 X |
| 4,365,158 | 12/1982 | Tallon | 73/40.7 X |
| 4,436,998 | 3/1984 | Tallon | 73/40.7 X |

FOREIGN PATENT DOCUMENTS 2713580 10/1978 Fed. Rep. of Germany .
1428585 1/1966 France .
2316663 12/1976 France .

Primary Examiner—Stewart J. Levy
Assistant Examiner—Joseph W. Roskos
Attorney, Agent, or Firm—Sughrue, Mion, Zinn, Macpeak & Seas; Sughrue, Mion, Zinn, Macpeak & Seas

[57] ABSTRACT

A tracer gas leakage detector mainly comprises a primary vacuum pump which is selectably connectable to a unit to be tested for leakage, an inlet valve also connectable to the unit to be tested and communicating with a measurement cell capable of being evacuated by a primary pump and a secondary pump. The inlet valve includes a motor-controlled valve member to enable the aperture through the inlet valve to be servo-controlled to the inlet pressure of the measurement cell, and conversion means providing an electrical signal representative of the aperture. The apparatus for measuring and displaying the leakage flow rate is connected to receive the aperture size representing electrical signal and includes a display system for displaying, as a function of the aperture size representing electrical signal, a valid sub-range of n decades of possible valid measurements taken from a total measuring range of N decades for the apparatus as a whole, thereby warning users that any indicated leakage flow rate values outside the valid sub-range are spurious. The N decades may be marked on a band (22) which is movable relative to a window (24). A pointer (25) is also movable relative to the window. A reading is valid if the pointer lies in the window.

4 Claims, 3 Drawing Figures

APPARATUS FOR MEASURING AND DISPLAYING LEAKAGE RATES IN A TRACER GAS LEAKAGE DETECTOR

BACKGROUND OF THE INVENTION

A known practice for monitoring sealing in units such as tanks or vacuum installations consists in using a tracer gas such as helium, and in injecting the tracer gas into the unit under test. If the unit has a crack or other leak, helium escapes therethrough and is directed to a measuring device such as a gas analysis mass spectrometer which then enables the size of the leak to be determined as a function of the quantity of helium detected.

A conventional helium detector generally comprises four parts:

(1) A first part for evacuating air from the unit under test, eg. a primary pump of the vane type in association with items such as a pump shut-off valve, an air inlet valve, and a pressure measuring manometer;

(2) A second part for analysing the tracer gas coming from said first part, and therefore including an analysis cell such as a mass spectrometer, a primary pump such as a vane pump, a secondary pump such an ionic or turbo-molecular diffusion pump, a trap, eg. using liquid nitrogen, and a pressure measuring manometer;

(3) A third part suitable for conveying the gas mixture for analysis, or a fraction thereof, into said second part and generally including a variable flow rate valve; and (4) A fourth part for calculating and displaying the results, and hence the size of the leaks, eg. by means of suitable electronic apparatus.

Unfortunately, in conventional leak detection techniques, a leak to be detected may be anywhere in the range $10^{-11}$ to $10^3$ atmosphere $cm^3$/second. Such a range is generally expressed as being over N decades, which means that the values indicated correspond to a range of 15 decades.

Because of this very wide range of possible leakage rates, leak detector manufacturers have been constrained to provide a variety of set-ups matched to specific, narrower ranges.

For example, for low value leakage rates, say in the range $10^{-11}$ to $10^{-5}$ atmosphere $cm^3$/sec, the entire helium flow is directed to the analyser, with the valve in said second part being fully open.

For medium leakage rates, say in the range $10^{-5}$ to 1 atmosphere $cm^3$/sec a portion of the gas flow is diverted via the primary pump of the said first part of the detector, while the valve in the second part is either partially open or else is replaced by a low flow rate valve.

Finally, at high leakage rates, ie. rates of more than 1 atmosphere $cm^3$/sec, it is necessary to limit the flow rate through the valve in the second part by some suitable means such as a diaphragm, a capilary tube, or the like, or even to replace the valve with a membrane.

The net result is that the analysis cell measures a helium flow rate q passing through the cell which, depending on circumstances, may either correspond to the total rate Q of helium leakage from the unit under test, or to a fraction thereof.

The electronic circuits associated with the analysis cell are capable of measuring only over a relatively small number of decades, say 5 or at most 6.

In other words, current detectors operate only over a limited number of decades, and there is no way for a user to be informed simultaneously of the exact flow rate Q through the crack being measured, and the appropriate range for performing the measurement. For example, if a user sets the apparatus to measure a leakage rate of about $10^{-10}$ atmosphere $cm^3$/sec when the leakage is in fact about $10^{-2}$ atmospheres $cm^3$/sec, the "measured" result will be erroneously limited to about $10^{-5}$ atmosphere $cm^3$/sec.

Preferred embodiments of the present invention remedy the above-mentioned drawbacks, and enable an operator to be fully informed about the capabilities of the measuring apparatus.

SUMMARY OF THE INVENTION

The present invention provides apparatus for measuring and displaying leakage flow rate Q in a tracer gas leakage detector of the type mainly operating a primary vacuum pump which is selectably connectable to a unit to be tested for leakage, an inlet valve also connectable to said unit to be tested and communicating with a measurement cell capable of being evacuated by pumping means including a primary pump and a secondary pump, said inlet valve including a motor-controlled valve member to enable the apperture through the inlet valve to be servo-controlled to the inlet pressure of said measurement cell, and conversion means providing an electrical signal representative of said apperture, the improvement wherein the apparatus for measuring and displaying the leakage flow rate is connected to receive said apperture-representing electrical signal and includes a display system for displaying, as a function of said apperture-representing electrical signal, a valid sub-range of n decades of possible valid measurements taken from a total measuring range of N decades for the apparatus as a whole, thereby warning users that any indicated leakage flow rate values outside said valid sub-range are spurious.

Preferably said display system comprises a scale graduated with said entire range of N decades, a window of width corresponding to a sub-range of n decades, said graduated scale and said window being movable relative to each other to display said valid sub-range, and a pointer movable relative to said scale to indicate a measured leakage flow rate, said flow rate being taken to be valid only if the pointer lies within the limits of the window.

For example, the scale may be marked on a strip which is movable relative to said window as a function of said apperture-representing electrical signal, and said pointer may be a needle likewise movable relative to said window.

Alternatively, the scale may be marked on a fixed strip, with the display system including means for moving illuminated reference marks on said strip, said marks including first and second window-delimiting marks and a measurement pointer mark.

BRIEF DESCRIPTION OF THE DRAWINGS

An embodiment of the invention is described by way of example with reference to the accompanying drawings, in which.

MORE DETAILED DESCRIPTION

Figure 1:
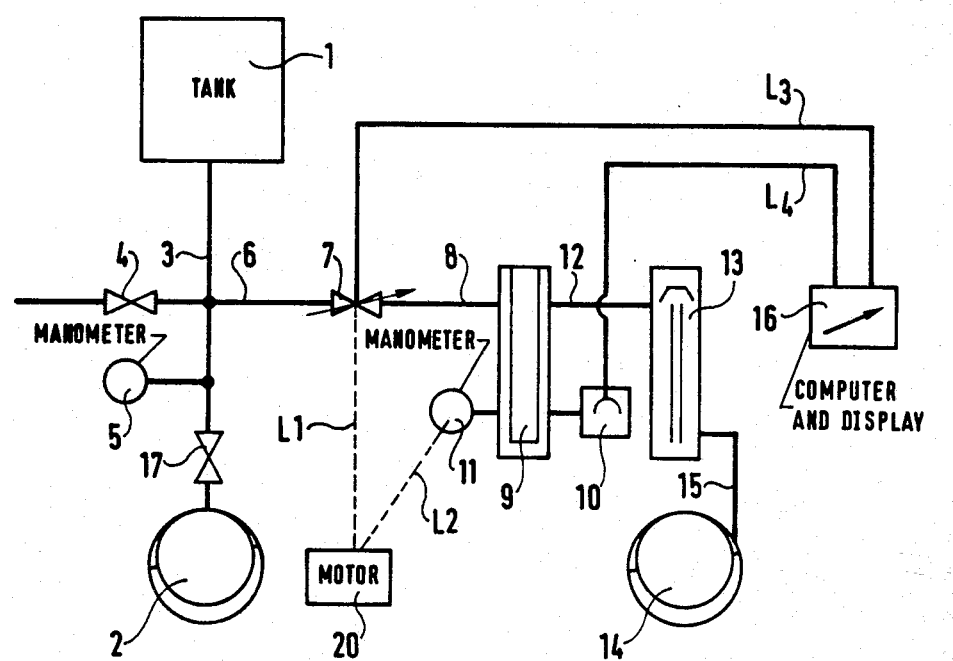
FIG. 1 is a a diagram of a preferred embodiment of the invention.

In FIG. 1, the reference 1 designates a unit, eg. a tank, which is to be tested for gas-tightness.

The tank is connected to a primary vane pump 2 by a conduit 3, with a valve 17 being inserted in the conduit 3 in such a position as to enable the pump 2 to be isolated when required. An air inlet valve 4 and a manometer 5 are also connected to the conduit 3.

A second conduit 6 puts the first conduit 3 into communication with an inlet valve 7 leading to an analysis cell which is described in greater detail further on.

The inlet valve 7 communicates via a third conduit 8 with a liquid nitrogen trap 9 which in turn is connected to a manometer 11 and an analysis cell 10 such as a mass spectrometer. In addition, a fourth conduit 12 connects the trap 9 to a secondary pump 13 which is itself connected to a primary vane pump 14 via pipework 15.

By way of example, the secondary pump 13 may be a diffusion pump, a turbomolecular pump, an ionic pump, or any other suitable secondary pump.

The inlet valve 7 is under motor control, ie. it includes a valve member having a profile such that it is capable of progressively varying the valve apperture size to work with upstream pressures in the range $10^{-4}$ to 1 millibar. The valve member is driven by an electric or a pneumatic motor 20 and is controlled as a function of the pressure measured by the manometer 11. Lines L1 and L2 diagrammatically represent the motor's action on the valve member and the manometer's action on the motor. Moving the valve member also causes an angular displacement detector (not shown) to move by a corresponding amount. Suitable angular displacement detector means include a potentiometer having a cursor which is moved in conjunction with the valve member. The angular displacement detector applies an electrical signal representative of the position of the valve member to a line $L_3$ which is connected to electronic means 16 for calculating and displaying measurement results.

The electronic means 16 is also connected via a line $L_4$ to receive electrical signals from the analysis cell 10. The output signal from the analysis cell is applied to the line $L_4$ via a logarithmic amplifier. For brevity, the electronic means 16 may be referred to as a computer, and in microprocessor-controlled laboratory apparatus it may indeed be implemented by a portion of the processor software, but as explained below, it is also capable of being implemented by relatively simple analog means.

Figure 2:
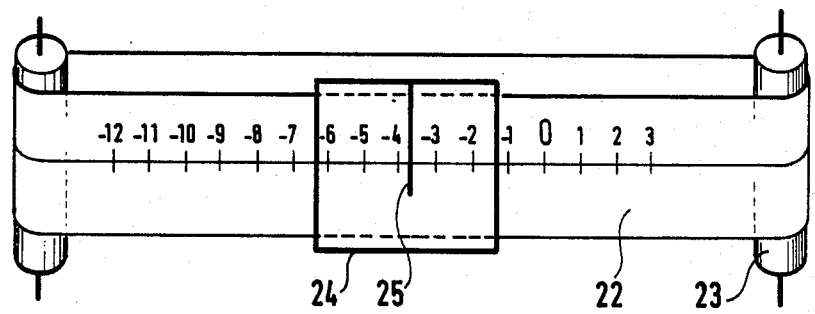
FIG. 2 shows a first display device for use with a detector in accordance with the invention.

One form of measurement display is shown in FIG. 2. It comprises a movable pointer 25 co-operating with a movable scale graduated from $-12$ to $+3$. The scale is marked on a band 22 which runs over end rollers 23, while the pointer 25 is located behind a window 24. The graduations on the scale represent powers of ten in the range $10^{-12}$ to $10^3$ in units of atmosphere cm$^3$/sec. In other words it is a logarithmic scale covering 15 decades. The computer 16 causes the band 22 to move as a function of the valve position signal received via the line $L_3$. The position of the band behind the window 24 thus immediately informs the user of the particular range of 4 or 5 decades over which measurements are possible with any particular configuration of the apparatus.

The computer 16 also causes the pointer 25 to move, but as a function of the signal it receives via the line $L_4$. The signal applied to the line $L_4$ by the cell 10 via its logarithmic output amplifier is representative of the logarithm of the flow rate q of tracer gas, eg. helium, through the cell 10. It is thus possible to move the pointer 25 as a linear function of the received signal to obtain the required reading of the leakage flow rate Q from the logarithmic scale on the band 22.

In other words, the display device shown in FIG. 2 not only provides the required reading of the leakage rate Q when the apparatus is properly set up, but it also provides the operator with a clear indication of the range of decades over which readings a valid, regardless of the gas inlet pressure. There is thus a reduced risk of incorrect readings being taken.

Such apparatus is particularly applicable to leakage detectors which use hydrogen or helium as tracer gases.

Figure 3:
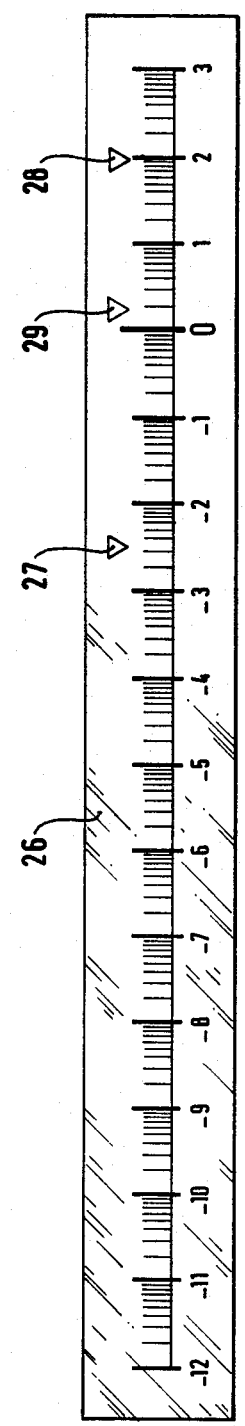
FIG. 3 shows a variant of the device shown in FIG. 2.

The invention is not limited to the particular embodiment described above, and numerous modifications can be made without going beyond the scope of the invention. In particular, FIG. 3 shows a variant form of display. In the FIG. 3 display, the N decades of graduations are marked on a fixed scale 26. The window is represented by limit marks 27 and 28 in the form of illuminated moving triangles and the pointer is in the form of a third illuminated moving triangle 29. For valid readings the pointer mark 29 must be between the window marks 27 and 28. As before, the numbers on the scale are powers of ten in units of atmosphere cm$^3$/sec.

We claim:

1. Apparatus for measuring and displaying leakage flow rate Q in a tracer gas leakage detector of the type mainly comprising a primary vacuum pump which is selectably connectable to a unit to be tested for leakage, an inlet valve also connectable to said unit to be tested and communicating with a measurement cell capable of being evacuated by pumping means including a primary pump and a secondary pump, said inlet valve including a motor-driven, displaceable valve member forming a variable size valve aperture, means for controlling said motor to vary the position of said valve member to change the aperture size of the inlet valve correlated to the inlet pressure of said measurement cell, and conversion means providing an electrical signal representative of said aperture size, the improvement wherein said apparatus for measuring and displaying the leakage flow rate is connected to receive said aperture size-representing electrical signal and includes a display system for displaying, as a function of said aperture size-representing electrical signal, a valid sub-range of n decades of possible valid measurements taken from a total measuring range of N decades for the apparatus as a whole, thereby warning users that any indicated leakage flow rate values outside said valid sub-range are spurious.

2. Apparatus according to claim 1, wherein said display system comprises a scale graduated with said entire range of N decades, a window of width corresponding to a sub-range of n decades, and means for moving said graduated scale and said window relative to each other to display said valid sub-range, a pointer and means for moving said pointer relative to said scale to indicate a measured leakage flow rate, said flow rate being valid only if the pointer lies within the limits of the window.

3. Apparatus according to claim 2, wherein the scale is marked on a strip movable relative to said window as a function of said aperture size-representing electrical signal, and wherein said pointer is a needle likewise movable relative to said window.

4. Apparatus according to claim 2, wherein the scale is marked on a fixed strip, and wherein the display system includes means for moving illuminated reference marks on said strip, said marks including first and second window-delimiting marks and a measurement pointer mark.

* * * * *